United States Patent
Mzyk et al.

(10) Patent No.: US 10,826,675 B2
(45) Date of Patent: Nov. 3, 2020

(54) METHOD FOR OPERATING A RADIO TRANSMISSION SYSTEM, AND ARRANGEMENT OF A RADIO TRANSMISSION SYSTEM

(71) Applicant: DIEHL METERING SYSTEMS GMBH, Nuremberg (DE)

(72) Inventors: Raphael Mzyk, Kammerstein (DE); Hristo Petkov, Nuremberg (DE); Thomas Kauppert, Nuremberg (DE); Klaus Gottschalk, Winkelhaid (DE)

(73) Assignee: Diehl Metering Systems GmbH, Nuremberg (DE)

( * ) Notice: Subject to any disclaimer, the term of this patent is extended or adjusted under 35 U.S.C. 154(b) by 0 days.

(21) Appl. No.: 16/427,497

(22) Filed: May 31, 2019

(65) Prior Publication Data

US 2019/0379522 A1   Dec. 12, 2019

(30) Foreign Application Priority Data

Jun. 8, 2018  (DE) .......... 10 2018 004 567
Jun. 19, 2018 (DE) .......... 10 2018 004 815

(51) Int. Cl.
*H04L 7/00*   (2006.01)
*H04W 56/00*  (2009.01)
(Continued)

(52) U.S. Cl.
CPC .......... *H04L 7/0025* (2013.01); *H04B 1/713* (2013.01); *H04L 7/0033* (2013.01);
(Continued)

(58) Field of Classification Search
CPC ..... H04L 1/0025; H04L 7/0033; H04B 1/713; H04W 52/0245; H04W 52/0248
See application file for complete search history.

(56) References Cited

U.S. PATENT DOCUMENTS 9,264,216 B1   2/2016 Vu et al.
9,354,081 B2   5/2016 Bernhard et al.
(Continued)

FOREIGN PATENT DOCUMENTS

DE   102010043151 A1   5/2012
DE   102011082098 B4   4/2014
(Continued)

*Primary Examiner* — Jaison Joseph
(74) *Attorney, Agent, or Firm* — Laurence A. Greenberg; Werner H. Stemer; Ralph E. Locher

(57) ABSTRACT

A method operates a radio transmission system with a radio transmitter and a radio receiver. The radio transmitter has a transmitter timer and transmits a packet and/or a subpacket and/or a plurality of packets in succession for the transmission of data. A carrier frequency and the transmission times of the data and/or the carrier frequency and the sampling rate of the data and/or the transmission times of the data and the sampling rate of the data depend on the transmitter timer. The radio receiver has a receiver timer with time-measuring measures to define transmission times, carrier frequencies and/or sampling rates. The radio receiver estimates an error on the basis of the received data and determines a time error therefrom. A temporal correction factor for the compensation is defined on the basis of the time error.

19 Claims, 3 Drawing Sheets

(51) Int. Cl.
*H04B 1/713* (2011.01)
*H04W 52/02* (2009.01)

(52) U.S. Cl.
CPC ... *H04W 52/0245* (2013.01); *H04W 52/0248* (2013.01); *H04W 56/005* (2013.01)

(56) References Cited

U.S. PATENT DOCUMENTS

| | | |
|---|---|---|
| 10,039,084 B2 | 7/2018 | Bernhard et al. |
| 10,574,501 B2 * | 2/2020 | Kilian ................ H04L 27/2659 |
| 2009/0141836 A1 | 6/2009 | Shirakata et al. |
| 2011/0099445 A1 | 4/2011 | Goto et al. |
| 2011/0158367 A1 | 6/2011 | Banister et al. |
| 2013/0230060 A1 | 9/2013 | Bernhard et al. |
| 2016/0006557 A1 | 1/2016 | Shirakawa et al. |
| 2019/0036757 A1 * | 1/2019 | Kilian ................ H04L 27/2691 |
| 2019/0052227 A1 * | 2/2019 | Troger ................ H04L 27/2695 |

FOREIGN PATENT DOCUMENTS

| | | | |
|---|---|---|---|
| EP | 1791100 A1 * | 5/2007 | ............ H03J 1/0091 |
| EP | 1791100 B1 | 9/2008 | |
| EP | 3211847 A2 | 8/2017 | |
| WO | 2016189995 A1 | 12/2016 | |

\* cited by examiner

METHOD FOR OPERATING A RADIO TRANSMISSION SYSTEM, AND ARRANGEMENT OF A RADIO TRANSMISSION SYSTEM

CROSS-REFERENCE TO RELATED APPLICATION

This application claims the priority, under 35 U.S.C. § 119, of German applications No. DE 10 2018 004 567.7, filed Jun. 8, 2018 and No. DE 10 2018 004 815.3, filed Jun. 19, 2018; the prior application is herewith incorporated by reference in its entirety.

BACKGROUND OF THE INVENTION

Field of the Invention

The invention relates to a method for operating a radio transmission system with the features of the preamble according to the independent method claim. The present invention furthermore relates to an arrangement of a radio transmission system according to the preamble to the independent system claim.

Intelligent consumption metering devices, also referred to as consumption meters or smart meters, are consumption metering devices incorporated into a supply network, e.g. for heat or energy, electricity, gas or water, which indicate the actual consumption to the respective connection user and are incorporated into a communication network. Intelligent consumption metering devices offer the advantage that manual meter readings are no longer required and shorter-term billing can be implemented by the provider according to actual consumption. Shorter-term reading intervals in turn enable a more accurate linkage between end customer tariffs and the development of trading prices for electricity. Supply networks can also be substantially more effectively utilized.

Intelligent consumption metering devices are normally assigned in each case to residential units or residential buildings. The metering data generated there can be read in many different ways. Metering data can be transmitted, for example, using mobile radio communication technology in the form of data packets or messages. However, this is expensive, requires the installation of mobile radio communication modules on the consumption metering devices and has disadvantages in terms of the high power consumption on the individual consumption metering devices. Furthermore, metering data can also be transmitted in the form of data packets or messages via a radio link, for example in the industrial, scientific, medical (ISM) band frequency range or in the short range devices (SRD) band frequency range. These frequency ranges offer the advantage that operators require only a general license for frequency management. However, the problem exists that interference can often occur due to the frequency of use of frequency ranges of this type for a wide range of technical devices, such as, for example, garage door controls, alarm systems, WLAN, Bluetooth, smoke detectors, etc. The metering data are collected via a radio link by either stationary or mobile data collectors or base stations to which the metering data provided in the transmitters of the consumption metering devices are transmitted.

For legal reasons, only metering data which are transmitted during specific, very short set time periods (set time or set point in time, including time deviation) to the data collector may be used by the transmitters of the consumption metering devices for the consumption evaluation. The transmitters of all consumption metering devices transmit their data packets to the receiver of the data collector during these very short set time periods. Data packets received outside the set time periods are rejected. It quite frequently occurs here that the transmissions of metering data from transmitters of different consumption metering devices interfere with one another during the set time period. Building-specific characteristics can also often result in interference in the transmission of the metering data from the consumption metering devices to the base station or data collector. As a result of all these factors, there is only a moderate probability that the data packets will be successfully transmitted in the channel concerned.

Radio communication over very long ranges requires, inter alia, highly sensitive receiver systems. A further difficulty is that communication systems with radio transmission between the data collector and the consumption metering devices require very precise time synchronization between the communication modules located in the area of the consumption metering devices and those of the data collector.

This is associated with narrowband transmission channels which impose specific requirements in terms of precision in the frequency and in the timing of the devices involved. In order to make the radio communication less susceptible to interference and therefore increase the resilience of the system, the radio messages are, for example, divided into small subpackets as indicated in German patent DE 10 2011 082 098 B4, corresponding to U.S. Pat. Nos. 9,354,081 and 10,039,084. These subpackets are then transmitted at different times on different frequencies. This type of transmission type lies within the domain of the frequency hopping method or frequency spreading method.

In radio transmission systems of this type, the carrier frequencies, transmission times and sampling rates that are used are typically derived from high-frequency crystals or high-frequency crystal oscillators. The temporal events are derived from oscillating crystals, such as, for example, time crystals or clock crystals. During the communication, such as, for example, in a consumption data recording system or metering wireless network, manufacturing-related tolerances of the crystals that are used therefore define deviations within the frequency and time between the base station or data collector and the terminal device or consumption meter. This in turn can result in degrading effects, such as a reduced range or, in the worst case, a communication breakdown. In addition, the transmission of subpackets via temporally deferred partial packets imposes very stringent requirements in terms of the correspondence between the sampling rates of the transmitter and receiver, since temporally high-precision sampling is required over a long time period. A different fast sampling rate between the transmitter and receiver can similarly result in a degradation or breakdown of the communication.

Simple crystals with low power consumption are used as frequency reference devices, particularly in the area of the communication modules of autonomous consumption metering devices. Crystals of this type have crystal errors of 10-100 ppm due to manufacturing tolerances, temperature behaviour and ageing. In a standard crystal, for example, a crystal error of 50 ppm results in a deviation of 4.3 seconds per day or 26 minutes per annum.

European patent EP 1 791 100 B1 describes a radio transmission system with compensated transmitter frequency stability and a corresponding radio receive frequency search run. The radio transmission system contains at least one radio transmitter and at least one radio receiver.

The radio transmitter furthermore includes a timer with time-measuring device and a carrier frequency generator, wherein the time predefined by the timer is dependent on the frequency of the carrier frequency generator. The radio receiver searches in a frequency search run with a decreasing radio receive frequency in order to tune the radio receive frequency of the radio receiver to the radio transmit frequency of the radio transmitter. However, the radio transmitter is located in the terminal device or consumption meter and the radio receiver is located in a base station or data collector. An error compensation therefore takes place in the base station and not in a consumption meter, in particular not in an energy self-sufficient consumption meter.

SUMMARY OF THE INVENTION

The object of the present invention is to provide a novel method for operating a radio transmission system, and a novel arrangement with which transmission quality is increased with simultaneously increased cost efficiency and energy efficiency.

According to the invention, a method is provided for operating a radio transmission system with a radio transmitter and at least one radio receiver, wherein the radio transmitter includes at least one transmitter timer, in particular a clock generator, and transmits a packet and/or a subpacket and/or a plurality of packets in succession for the transmission of data. A carrier frequency and transmission times of data and the carrier frequency and sampling rate of the data and/or the transmission times of the data and the sampling rate of the data depend on the transmitter timer, in particular on a clock generator. The radio receiver has at least one receiver timer, in particular a clock generator, with a time-measuring device to define transmission times and/or to define carrier frequencies and/or to define sampling rates. In a characterizing manner, the radio receiver estimates an error, in particular a carrier frequency error and/or a sampling rate error and/or an error in the transmission time, on the basis of the received data and determines a time error therefrom. A temporal correction factor for the compensation is defined on the basis of the time error.

It is particularly appropriate if the carrier frequency and the transmission times of the data and/or the carrier frequency and the sampling rate of the data and/or the transmission times of the data and the sampling of the data are dependent on the same clock generator. Deviations in the frequency and/or the timing and/or in the sampling rate between a radio transmitter and a radio receiver can thus be advantageously compensated. A possibility is thus provided for preventing degrading effects, such as e.g. a reduced radio range or communication breakdown. The compensation of the deviations can advantageously be carried out in the radio receiver.

The possibility appropriately exists for the radio receiver to be energy self-sufficient. A further advantage of the method is therefore that it can be carried out on an energy self-sufficient radio receiver without imposing an additional requirement in terms of the energy needs of the radio receiver.

The radio transmitter can appropriately transmit a packet in fragmented form as subpackets by inserting at least two pauses within the packet, wherein the pauses are generated from the same transmitter timer as the one from which the carrier frequency is generated. This offers the advantage, for example, that existing transmission bandwidths can be effectively utilized.

The radio receiver and/or the radio transmitter can advantageously be deactivated in the pauses of the packet, in particular can switch to a sleep mode, in order to save energy, and the wake-up can be defined, inter alia, by the temporal correction factor. The radio receiver and/or the radio transmitter can appropriately be deactivated between two consecutive packets, in particular can switch to a sleep mode, in order to save energy, and the wake-up for a next packet can be defined, inter alia, by the temporal correction factor. The deactivation in the pauses of a packet or between two consecutive packets advantageously enables the energy efficiency of the radio receiver and/or the radio transmitter to be increased. The possibility exists to use the temporal correction factor so that a wake-up can be achieved at the correct time. A possible error in the transmission time or a time error, for example, can thus be compensated in a simple manner.

The possibility appropriately exists for the radio receiver to calculate a difference between the transmitter timer and the receiver timer on the basis of the carrier frequency of the radio transmitter and to calculate at least one correction factor therefrom. The difference, for example, in the carrier frequencies of the radio transmitter and the radio receiver can be determined in order to define the carrier frequency error.

A different wake-up time can advantageously be calculated for each subpacket on the basis of the difference between the transmitter timer and the receiver timer. It can be similarly advantageous for a different wake-up time to be calculated for each packet on the basis of the difference between the transmitter timer and the receiver timer. The possibility exists for the correction factor to change over time so that an individual wake-up time can advantageously be calculated for each subpacket or each packet.

The transmitter timer of the radio transmitter can appropriately comprise an oscillating crystal and a high-frequency crystal. An oscillating crystal and a high-frequency crystal can furthermore be used in crystal oscillators. The oscillating crystal can be a low-frequency crystal which can appropriately be configured as a time crystal or clock crystal. The method can thus enable the compensation of crystal tolerances. Advantageously, the need does not exist to impose particular requirements in terms of frequency precision and/or stability on the crystals that are used. As a result, the method can advantageously be implemented in a cost-effective manner.

In the radio transmitter, an oscillating crystal can appropriately be used in the crystal oscillator for the time basis. The high-frequency crystal and the oscillating crystal, in particular as a time crystal or clock crystal, can be tuned by measuring the number of oscillations or ticks of the high-frequency crystal oscillator in one or more time periods of the oscillating crystal. A relationship can therefore be established between the deviation from the nominal frequency and the nominal temporal resolution. The possibility thus exists for the carrier frequency and the transmission times of the data and/or the carrier frequency and the sampling rate of the data and/or the transmission times of the data and the sampling rate of the data to be dependent on the same clock generator. For this purpose, the possibility exists, for example, for a high-frequency crystal to be used from which the values are derived, or e.g. a coupled system consisting of a high-frequency crystal and a low-frequency crystal. This coupling can be implemented, for example, by means of a hardware line between the crystals or e.g. by a reciprocal measuring of the crystals, wherein, in the event of an offset, said offset is compensated.

The method can appropriately comprise the following method steps:

a) a synchronization sequence is transmitted by the radio transmitter on a carrier frequency;
b) the radio receiver searches in a defined search window for possible carrier signals of the radio transmitter;
c) the radio receiver finds the carrier signal of the radio transmitter;
d) the radio receiver determines the frequency error and/or the time error of the radio transmitter from the received synchronization sequence.

The synchronization sequence transmitted by the radio transmitter is searched for by the radio receiver, for example by means of a frequency sweep. For the frequency sweep, the frequency can be swept periodically and/or continuously within a predefined range in a defined search window. Possible carrier signals of the radio transmitter can be searched for in a specific search bandwidth. The radio receiver finds the carrier signal of the radio transmitter and therefore also receives the synchronization sequence. If a frequency offset exists between the transmitted carrier frequency of the radio transmitter and the carrier frequency expected by the radio receiver, the frequency error, for example, between the radio transmitter and the radio receiver can be defined. The frequency error can thus already be inherently compensated. A time error between the radio transmitter and the radio receiver can be determined, for example, in that the carrier signal of the radio transmitter does not reach the radio receiver at the expected time.

The receiver timer of the radio receiver can appropriately comprise an oscillating crystal and a high-frequency crystal. The oscillating crystal can appropriately be designed as a time crystal or clock crystal. The method can compensate crystal tolerances without particular requirements in terms of frequency accuracy and/or stability having to be imposed on the crystals used. As a result, the method can advantageously be implemented in a cost-effective manner.

Temporal deviations between the radio transmitter and the radio receiver can be reflected in different sampling rates of the two communication partners. In order to take account of these temporal deviations in the radio receiver, the possibility exists for a two-stage calibration method to be carried out.

The method can comprise a first calibration step with the following method step: tuning the oscillating crystal of the receiver timer to the high-frequency crystal of the receiver timer while the high-frequency crystal is activated.

The high-frequency crystal oscillator is activated in the radio receiver, for example only during reception or during reception standby. The first calibration step is therefore carried out during the active time of the high-frequency crystal oscillator in the radio receiver, such as, for example, during the reception of the synchronization sequence of the radio transmitter. The high-frequency crystal oscillator of the radio receiver is advantageously activated in any event during reception. As a result, the method advantageously imposes no additional requirements in terms of the energy needs of the radio receivers. The method can thus be carried out in an energy-efficient manner. The possibility furthermore exists for the radio receiver to be equipped, in an alternative design, with two-way communication means. The high-frequency crystal oscillator can also be activated here during the transmission of the radio receiver so that a tuning of the oscillating crystal to the high-frequency crystal is possible during transmission.

The oscillating crystal can appropriately be a clock crystal or time crystal, so that a tuning of the clock crystal or time crystal and the high-frequency crystal takes place in the first calibration stage. The number of cycles, for example, of the high-frequency crystal completed during one cycle of the clock crystal or time crystal is counted for this purpose. The possibility thus exists for the oscillating crystal, in particular as a clock crystal or time crystal, to be used to predefine the rough temporal pattern in the timing, since the number of cycles of the high-frequency crystal which correspond to one cycle of the oscillating crystal is known.

The high-frequency crystal can advantageously be used for a fine-tuning of the time units. Time units which are less than one cycle of the oscillating crystal, in particular the clock crystal or time crystal, can thus be defined and set by the high-frequency crystal during the fine-tuning. The high-frequency crystal oscillator is advantageously activated in any event if the fine-tuning takes place immediately before a receive event.

The first calibration step can appropriately additionally comprise the following method step: activating the high-frequency crystal of the receiver timer.

The possibility appropriately exists for the correction factor to be formed from at least two correction factors, wherein at least one correction factor is obtained from the difference between the transmitter timer and the receiver timer, in particular from a crystal error, and at least one correction factor is obtained from the difference between the oscillating crystal of the receiver timer and the high-frequency crystal of the receiver timer. The offset, for example, resulting from the difference between the clock generators in the radio transmitter and in the radio receiver can be compensated with a correction factor. A further offset may also occur which is caused by a divergence over time, in particular over a lengthy period of time, of the clock generators or the clock crystals in the radio transmitter and in the radio receiver. The offset between the radio transmitter and the radio receiver can thus change over time. A further correction factor, for example, can be defined for this change over time.

The method can comprise a second calibration step with the following method steps:

a) defining the sampling rate error of the radio transmitter by defining the deviation of the carrier frequency of the radio transmitter; and
b) calculating a temporal correction factor on the basis of the sampling rate error for the compensation of different sampling rates between the radio transmitter and the radio receiver.

The crystal frequency of the high-frequency crystal of the radio transmitter can be inferred from the deviation of the carrier frequency. The sampling rate error of the radio transmitter can furthermore be defined here by the crystal frequency of the high-frequency crystal of the radio transmitter. This is possible since the time, the frequency and the sampling rate are derived in the radio transmitter from the same timer or clock generator. In addition, the pauses between the packets and the pauses within the packets can be derived from the same timer or clock generator. The deviation of the carrier frequency of the radio transmitter may already be known to the radio receiver through the reception of the synchronization sequence.

With knowledge of the sampling rate error of the radio transmitter, the possibility exists for a temporal correction factor to be calculated in the radio receiver. This temporal correction factor predefines a temporal shift of the receive window so that different sampling rates of the radio transmitter and of the radio receiver can be compensated in the radio receiver.

The radio transmission system can appropriately be a narrowband system. Narrowband transmission channels impose specific requirements in terms of the accuracy of the frequency and the accuracy of the timing. The method can thus offer the possibility to determine and compensate frequency errors and/or time errors and/or sampling rate errors, as a result of which the requirements of a narrowband system can be met.

It is particularly appropriate if the radio transmission system is a system with a frequency hopping method. The Frequency Hopping Spread Spectrum (FHSS), for example, represents a possible frequency hopping method or frequency spreading method for wireless data transmission. In a frequency hopping method, the temporal correction factor defined in the second calibration step provides the temporal shift of the receive window per hop.

In one possible design, the method can be used in a radio transmission system with a splitting method. One possible splitting method is described in German patent DE 10 2011 082 098 B4.

The radio transmitter can appropriately be a base station and the radio receiver a consumption meter. The possibility furthermore exists for the radio transmitter to be designed as a data collector. The consumption meter is furthermore energy self-sufficient. It can, for example, be battery-operated in order to implement an energy self-sufficient consumption meter. A possibility is therefore advantageously provided to carry out a compensation of carrier frequency errors and/or sampling rate errors and/or errors in the transmission time or time errors in the consumption meter.

The present invention furthermore secondarily claims an arrangement of a radio transmission system consisting of a radio transmitter and at least one radio receiver. The radio transmitter has at least one transmitter timer with a time-measuring device to define transmission times and/or to define carrier frequencies and/or to define sampling rates, and the radio receiver comprises at least one receiver timer with a time-measuring device to define transmission times and/or to define carrier frequencies and/or to define sampling rates. The arrangement is operable according to at least one of the preceding method claims.

Other features which are considered as characteristic for the invention are set forth in the appended claims.

Although the invention is illustrated and described herein as embodied in a method for operating a radio transmission system, and an arrangement of a radio transmission system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
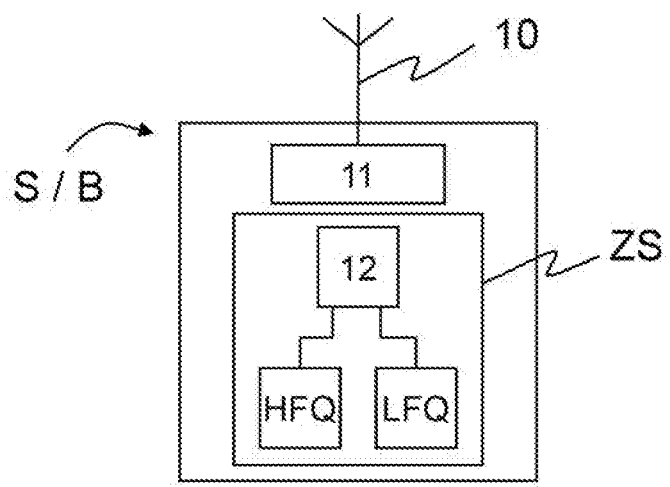
FIG. 1 is a substantially simplified schematic view of a generic radio transmission system.
Figure 1:
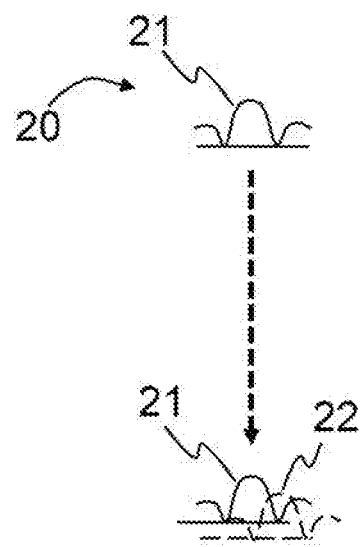
Figure 1:
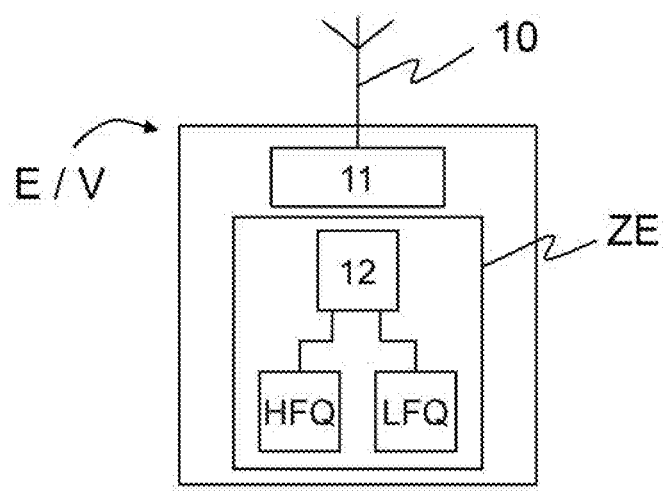

Referring now to the figures of the drawings in detail and first, particularly to FIG. 1 thereof, there is shown a simplified schematic view of a generic radio transmission system. The radio transmission system has a radio transmitter or base station B and a radio receiver or consumption meter V.

The base station B has a transmitter timer ZS which comprises a high-frequency crystal HFQ, a low-frequency crystal LFQ and a microcontroller 12. The high-frequency crystal HFQ is operated e.g. with an oscillator at a frequency of 40 MHz, wherein the low-frequency crystal LFQ is operated, for example, with an oscillator at a frequency of 32 kHz. The low-frequency crystal LFQ can be used as a clock crystal or time crystal. The high-frequency crystal HFQ and the low-frequency crystal LFQ are coupled via a microcontroller 12. The respective other crystal can, for example, be measured to tune the crystals to one another. The low-frequency crystal LFQ can, for example, measure the high-frequency crystal HFQ and compensate a possible offset, in particular a temporal offset. The base station B furthermore has a communication module 11 and an antenna 10 for the wireless data transmission.

The consumption meter V contains a receiver timer ZE which contains a high-frequency crystal HFQ, a low-frequency crystal LFQ and a microcontroller 12. The high-frequency crystal HFQ is operated e.g. with an oscillator at a frequency of 40 MHz, wherein the low-frequency crystal LFQ is operated, for example, with an oscillator at a frequency of 32 kHz. The low-frequency crystal LFQ can be used as a clock crystal or time crystal. The high-frequency crystal HFQ and the low-frequency crystal LFQ are coupled via a microcontroller 12. The respective other crystal can, for example, be measured to tune the crystals to one another. The low-frequency crystal LFQ can, for example, measure the high-frequency crystal HFQ and compensate a possible offset, in particular a temporal offset, for example in the uplink from the consumption meter V to the base station B. The consumption meter V furthermore has a communication module 11 and an antenna 10 to receive a wireless data transmission. The consumption meter V, as the radio receiver E, is furthermore energy self-sufficient.

FIG. 1 furthermore shows the transmission of a synchronization sequence 20 from the base station B on a carrier frequency 21. The consumption meter V searches in a defined search window for possible carrier signals on a carrier frequency 21 of the base station B. The consumption meter V finds the carrier signal on a carrier frequency 21. If a frequency error occurs between the base station B and the consumption meter V, the carrier frequency 21 transmitted by the base station B does not match the carrier frequency 22 expected by the consumption meter V. The radio transmission system in FIG. 1 can furthermore be a narrowband system.

Figure 2:
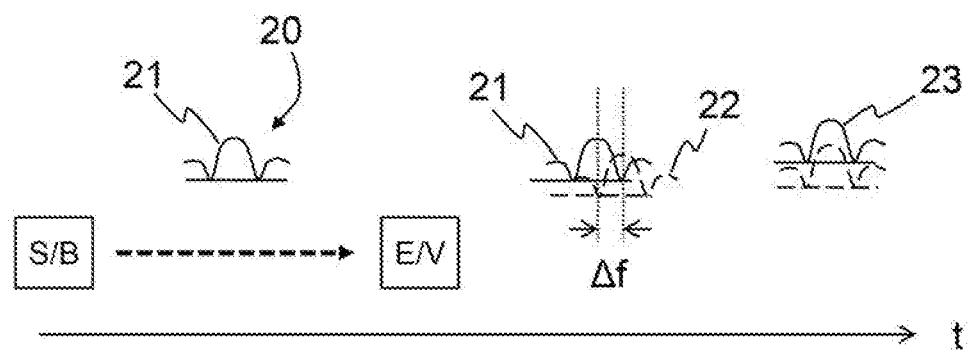
FIG. 2 is a substantially simplified schematic view of a transmission of a synchronization sequence.

FIG. 2 shows a simplified schematic view of the transmission of the synchronization sequence 20. The synchronization sequence 20 is first transmitted by the base station B on a carrier frequency 21. The consumption meter V then searches in a defined search window for possible carrier signals of the base station B. After the consumption meter V has found the carrier signal on a carrier frequency 21 of the base station B, the consumption meter V compares the received carrier frequency 21 with the expected carrier frequency 22. The consumption meter V can thereby determine the frequency offset or frequency error Δf between the received carrier frequency 21 and the expected carrier frequency 22. The possibility thus exists to inherently compensate the frequency error Δf between the base station B and the consumption meter V in the consumption meter V.

If the transmission times of the base station B are known in the consumption meter V, a time error of the base station B in relation to the consumption meter V can be defined in the consumption meter V by means of the receive time of a synchronization sequence 20 on a specific carrier frequency 21.

Figure 3:
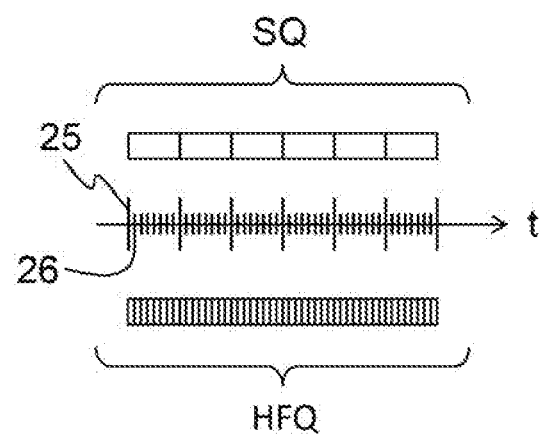
FIG. 3 is a substantially simplified schematic view of a tuning of an oscillating crystal and a high-frequency crystal.

FIG. 3 shows a simplified schematic view of the tuning of the oscillating crystal SQ and the high-frequency crystal HFQ. The oscillating crystal SQ can appropriately be a low-frequency crystal LFQ. In a first calibration step, the oscillating crystal SQ, in particular in the design as a clock crystal or time crystal, of the receiver timer ZE is tuned to the high-frequency crystal HFQ of the receiver timer ZE. The high-frequency crystal oscillator HFQ is activated for a tuning. The high-frequency crystal oscillator HFQ can be activated in any event at the time of the tuning, since it is activated during reception or during reception standby. The possibility furthermore exists to activate the high-frequency crystal oscillator HFQ for the tuning. The oscillation cycles of the oscillating crystal SQ are longer than the oscillating cycles of the high-frequency crystal HFQ. The number of completed cycles of the high-frequency crystal HFQ during one cycle of the oscillating crystal SQ is counted for the tuning, in particular in the design as a clock crystal or time crystal. The rough time pattern 25 in the timing can thus be specified by the oscillating crystal SQ. The possibility exists to use the high-frequency crystal HFQ for the division of the fine time pattern 26. Time units which are smaller than one cycle of the oscillating crystal SQ can thus be divided in a fine-tuning. The time reference of the oscillating crystal SQ and the high-frequency reference of the high-frequency crystal HFQ can be calibrated in relation to one another.

Figure 4:
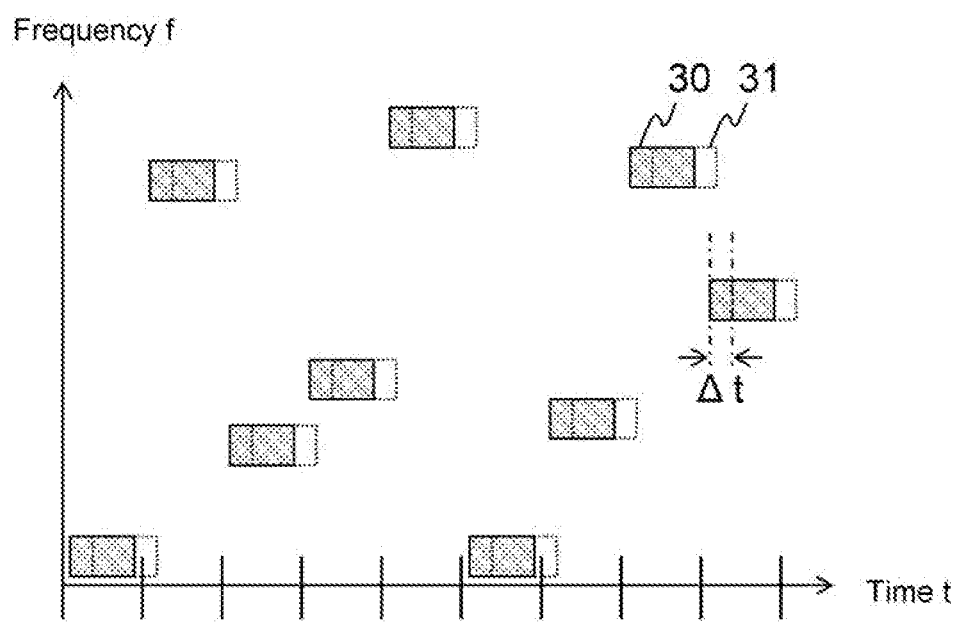
FIG. 4 is a substantially simplified schematic view of a definition of a sampling rate error.

FIG. 4 shows a simplified schematic view of the definition of the sampling rate error. The deviation of the carrier frequency 21 of the base station B from the carrier frequency 22 expected by the consumption meter V is defined in a second calibration step. The consumption meter V can in turn infer the crystal frequency of the high-frequency crystal HFQ of the base station B from the deviation of the carrier frequency 21. If the crystal frequency of the high-frequency crystal HFQ is present in the consumption meter V, the sampling rate error of the base station B can be defined therefrom in the consumption meter V. The diagram in FIG. 4 is drawn for a radio transmission system with a frequency hopping method. The carrier frequency 21 undergoes discrete frequency changes here, as indicated by the individual hops. The sequence of the frequency changes is defined, for example, by pseudorandom numbers. The useful data can first be subjected to narrowband modulation so that they can then be upconverted to specific frequencies. A frequency synthesizer which reverses and then conventionally demodulates the spreading is connected upstream of the receive modulator on the receiver side. If the sampling rate 30 of the base station B does not match the sampling rate 31 of the consumption meter V, a sampling rate error Δt occurs. Errors may occur in the signal processing due to the sampling rate error Δt. The possibility exists, for example, that symbols within a hop in the carrier signal of the base station B cannot be correctly sampled in the consumption meter V. The sampling in the consumption meter V can, for example, take place temporally too early on a frequency hop, as a result of which the last transmitted symbols on this frequency or this frequency hop can no longer be sampled. The same applies if the sampling takes place temporally too late, so that the symbols at the beginning of a frequency hop are not sampled. A temporal correction factor is calculated in the consumption meter V in order to correct or compensate this defective sampling. The sampling rate error Δt between the sampling rate 30 of the base station B and the sampling rate 31 of the consumption meter V is used for the calculation. It is ensured by means of the temporal correction factor that the beginning and end of the sampling of a frequency hop of the consumption meter V and of the base station B coincide with one another. As a result, the radio receiver E can also wake up with its frequency shifted in order to coincide precisely with the packets transmitted by the radio transmitter S.

The following is a summary list of reference numerals and the corresponding structure used in the above description of the invention:

B Base station
V Consumption meter
S Radio transmitter
E Radio receiver
ZS Transmitter timer
ZE Receiver timer
SQ Oscillating crystal
LFQ Low-frequency crystal
HFQ High-frequency crystal
10 Antenna
11 Communication module
12 Microcontroller
20 Synchronization sequence
21 Carrier frequency transmitted by the radio transmitter
22 Carrier frequency expected by the radio receiver
23 Carrier frequency with temporal correction factor
Δf Frequency error
25 Rough time pattern
26 Fine time pattern
30 Sampling rate of the radio transmitter
31 Sampling rate of the radio receiver
Δt Sampling rate error

The invention claimed is:

1. A method for operating a radio transmission system with a radio transmitter and at least one radio receiver, the radio transmitter having at least one transmitter timer, and the radio receiver having at least one receiver timer with time-measuring means to define transmission times and/or to define carrier frequencies and/or to define sampling rates, the receiver timer having an oscillating crystal and a high-frequency crystal, which comprises the steps of:

transmitting, via the radio transmitter, a packet, a sub-packet and/or a plurality of packets in succession for a transmission of data, a carrier frequency and transmission times of the data and/or the carrier frequency and a sampling rate of the data and/or the transmission times of the data and the sampling rate depend on the transmitter timer;

estimating, via the radio receiver, an error on a basis of the data and determining a time error from the error;

defining a temporal correction factor for compensation on a basis of the time error; and performing a first calibration step by tuning the oscillating crystal of the receiver timer to the high-frequency crystal of the receiver timer while the high-frequency crystal is activated.

2. The method according to claim 1, wherein the radio receiver is energy self-sufficient.

3. The method according to claim 1, which further comprises transmitting, via the radio transmitter, the packet in fragmented form as subpackets by inserting at least two pauses within the packet, wherein the pauses are generated from the transmitter timer from which the carrier frequency is generated.

4. The method according to claim 1, which further comprises deactivating the radio receiver and/or the radio transmitter between two consecutive said packets, namely a switch to a sleep mode, in order to save energy, and a wake-up for a next packet is defined, inter alia, by the temporal correction factor.

5. The method according to claim 1, which further comprises:
calculating, via the radio receiver, a difference between the transmitter timer and the receiver timer on a basis of a carrier frequency of the radio transmitter; and
calculating at least one correction factor from the difference.

6. The method according to claim 5, which further comprises calculating a different wake-up time for each subpacket on a basis of a difference between the transmitter timer and the receiver timer.

7. The method according to claim 4, which further comprises calculating a different wake-up time for each subpacket on a basis of a difference between the transmitter timer and the receiver timer.

8. The method according to claim 1, wherein the transmitter timer includes an oscillating crystal and a high-frequency crystal.

9. The method according to claim 8, which further comprises deriving the oscillating crystal from the high-frequency crystal.

10. The method according to claim 1, which further comprises:
transmitting a synchronization sequence by the radio transmitter on a carrier frequency;
searching, via the radio receiver, in a defined search window for possible carrier signals of the radio transmitter;
finding, via the radio receiver, a carrier signal of the radio transmitter; and
determining, via the radio receiver, a frequency error and/or a time error of the radio transmitter from the synchronization sequence received.

11. The method according to claim 1, which further comprises using the high-frequency crystal for a fine-tuning of the receiver timer and the transmitter timer.

12. The method according to claim 1, wherein the first calibration step additionally comprises activating the high-frequency crystal of the receiver timer.

13. The method according to claim 1, which further comprises performing a second calibration step which comprises the following method steps of:
defining a sampling rate error of the radio transmitter by defining a deviation of a carrier frequency of the radio transmitter; and
calculating the temporal correction factor on a basis of the sampling rate error for a compensation of different sampling rates between the radio transmitter and the radio receiver.

14. The method according to claim 1, wherein the radio transmission system is a narrowband system.

15. The method according to claim 1, wherein the radio transmission system is a system with a frequency hopping method.

16. The method according to claim 1, wherein the radio transmitter is a base station and the radio receiver is a consumption meter.

17. A radio transmission system, comprising:
a radio transmitter having at least one transmitter timer;
at least one radio receiver having at least one receiver timer with time-measuring means to define transmission times and/or to define carrier frequencies and/or to define sampling rates, said receiver timer having an oscillating crystal and a high-frequency crystal;
the radio transmission system programmed to:
transmit, via said radio transmitter, a packet, a subpacket and/or a plurality of packets in succession for a transmission of data, a carrier frequency and transmission times of the data and/or the carrier frequency and a sampling rate of the data and/or the transmission times of the data and the sampling rate depending on the transmitter timer;
estimate, via the radio receiver, an error on a basis of the data and determine a time error from the error;
define a temporal correction factor for compensation on a basis of the time error; and
at least one of:
perform a first calibration step by tuning said oscillating crystal of said receiver timer to said high-frequency crystal of said receiver timer while said high-frequency crystal is activated; or
form the temporal correction factor from at least first and second correction factors, the first correction factor is obtained from a difference between said transmitter timer and said receiver timer, and the second correction factor is obtained from a difference between said oscillating crystal of said receiver timer and said high-frequency crystal of said receiver timer.

18. A method for operating a radio transmission system with a radio transmitter and at least one radio receiver, the radio transmitter having at least one transmitter timer, and the radio receiver having at least one receiver timer with time-measuring means to define transmission times and/or to define carrier frequencies and/or to define sampling rates, which comprises the steps of:
transmitting, via the radio transmitter, a packet, a subpacket and/or a plurality of packets in succession for a transmission of data, a carrier frequency and transmission times of the data and/or the carrier frequency and a sampling rate of the data and/or the transmission times of the data and the sampling rate depend on the transmitter timer;
estimating, via the radio receiver, an error on a basis of the data and determining a time error from the error; and
defining a temporal correction factor for compensation on a basis of the time error;
providing the radio transmitter as a base station;
transmitting, via the radio transmitter, the packet in fragmented form as subpackets by inserting at least two pauses within the packet, wherein the pauses are generated from the transmitter timer from which the carrier frequency is generated; and
deactivating the radio receiver and/or the radio transmitter in the pauses of the packet, namely by switching to a sleep mode, in order to save energy, and a wake-up is defined, inter alia, by the temporal correction factor.

19. A method for operating a radio transmission system with a radio transmitter and at least one radio receiver, the radio transmitter having at least one transmitter timer, and the radio receiver having at least one receiver timer with time-measuring means to define transmission times and/or to define carrier frequencies and/or to define sampling rates, the receiver timer having an oscillating crystal and a high-frequency crystal, which comprises the steps of:

transmitting, via the radio transmitter, a packet, a sub-packet and/or a plurality of packets in succession for a transmission of data, a carrier frequency and transmission times of the data and/or the carrier frequency and a sampling rate of the data and/or the transmission times of the data and the sampling rate depend on the transmitter timer;

estimating, via the radio receiver, an error on a basis of the data and determining a time error from the error;

defining a temporal correction factor for compensation on a basis of the time error; and forming the temporal correction factor from at least first and second correction factors, the first correction factor is obtained from a difference between the transmitter timer and the receiver timer, and the second correction factor is obtained from a difference between the oscillating crystal of the receiver timer and the high-frequency crystal of the receiver timer.

* * * * *